United States Patent
Wang et al.

(10) Patent No.: US 12,469,601 B2
(45) Date of Patent: Nov. 11, 2025

(54) METHOD AND SYSTEM FOR INDIVIDUALIZED PREDICTION OF MENTAL ILLNESS ON BASIS OF BRAIN FUNCTION MAP MONKEY-HUMAN CROSS-SPECIES MIGRATION

(71) Applicant: CENTER FOR EXCELLENCE IN BRAIN SCIENCE AND INTELLIGENCE TECHNOLOGY, CHINESE ACADEMY OF SCIENCES, Shanghai (CN)

(72) Inventors: Zheng Wang, Shanghai (CN); Yafeng Zhan, Shanghai (CN)

(73) Assignee: CENTER FOR EXCELLENCE IN BRAIN SCIENCE AND INTELLIGENCE TECHNOLOGY, CHINESE ACADEMY OF SCIENCES, Shanghai (CN)

(*) Notice: Subject to any disclaimer, the term of this patent is extended or adjusted under 35 U.S.C. 154(b) by 1003 days.

(21) Appl. No.: 17/296,170

(22) PCT Filed: Nov. 4, 2019

(86) PCT No.: PCT/CN2019/115401
§ 371 (c)(1),
(2) Date: May 21, 2021

(87) PCT Pub. No.: WO2020/103683
PCT Pub. Date: May 28, 2020

(65) Prior Publication Data
US 2022/0130540 A1  Apr. 28, 2022

(30) Foreign Application Priority Data
Nov. 20, 2018 (CN) .................. 201811384845.X (51) Int. Cl.
*G16H 50/20* (2018.01)
*A61B 5/00* (2006.01)
(Continued)

(52) U.S. Cl.
CPC ........... *G16H 50/20* (2018.01); *A61B 5/0042* (2013.01); *A61B 5/4064* (2013.01); *G06F 18/214* (2023.01); *G16H 30/40* (2018.01)

(58) Field of Classification Search
CPC ............................. G16H 30/40; G16H 50/20
(Continued)

(56) References Cited

U.S. PATENT DOCUMENTS

| | | | |
|---|---|---|---|
| 2007/0112585 A1* | 5/2007 | Breiter | G16B 40/20 705/2 |
| 2015/0370993 A1 | 12/2015 | Moturu et al. | |
| 2017/0344723 A1 | 11/2017 | Hurst | |

FOREIGN PATENT DOCUMENTS

| | | |
|---|---|---|
| CN | 104450602 A | 3/2015 |
| CN | 105279380 A | 1/2016 |

(Continued)

OTHER PUBLICATIONS

International Search Report and Written Opinion; PCT Application No. PCT/CN2019/115401; mailed Jan. 23, 2020.
(Continued)

*Primary Examiner* — Nadia A Mahmood
(74) *Attorney, Agent, or Firm* — NKL Law; Bin Lu; Allen Xue (57) ABSTRACT

Provided are a method and system for individualized prediction of mental illness on the basis of brain function map monkey-human cross-species migration, and a method for determining a mental illness prediction model. The method for determining a mental illness prediction model comprises the steps: (a) data acquisition; (b) preprocessing; (c) brain
(Continued)

region selection; (d) feature construction; (e) feature screening; and (f) modeling prediction. The method and system are non-invasive and have high accuracy, high sensitivity, good specificity, and are convenient to popularize.

18 Claims, 5 Drawing Sheets

(51) Int. Cl.
*G06F 18/214* (2023.01)
*G16H 30/40* (2018.01)

(58) Field of Classification Search
USPC .......................................................... 600/300
See application file for complete search history.

(56) References Cited

FOREIGN PATENT DOCUMENTS

| CN | 106156484 A | 11/2016 |
|---|---|---|
| CN | 106384005 A | 2/2017 |
| CN | 109528197 A | 3/2019 |
| CN | 101773096 A | 7/2021 |
| WO | 2017210502 A1 | 12/2017 |
| WO | 2018005820 A1 | 1/2018 |
| WO | 2020103683 A1 | 5/2020 |

OTHER PUBLICATIONS

English translation of International Search Report and Written Opinion; PCT Application No. PCT/CN2019/115401; mailed Jan. 23, 2020; retrieved from Patentscope on May 21, 2021.
English abstract of CN109528197; retrieved from www.espacenet.com on May 21, 2021.
English abstract of CN106156484; retrieved from www.espacenet.com on May 21, 2021.
English abstract of CN105279380; retrieved from www.espacenet.com on May 21, 2021.
English abstract of CN106384005; retrieved from www.espacenet.com on May 21, 2021.
English abstract of CN104450602; retrieved from www.espacenet.com on May 21, 2021.
English abstract of CN101773096; retrieved from www.espacenet.com on May 21, 2021.

* cited by examiner

METHOD AND SYSTEM FOR INDIVIDUALIZED PREDICTION OF MENTAL ILLNESS ON BASIS OF BRAIN FUNCTION MAP MONKEY-HUMAN CROSS-SPECIES MIGRATION

CROSS REFERENCE TO RELATED APPLICATIONS

The present application is the U.S. National Phase under 35 U.S.C. § 371 of International Application No. PCT/CN2019/115401, filed Nov. 4, 2019, which claims the priority of the Chinese patent application filed with the Chinese Patent Office on Nov. 20, 2018, with the application number CN201811384845.X and the invention title of "Method and system for individualized prediction of mental illness on basis of brain function map monkey-human cross-species migration", the entire contents of each of which are herein incorporated by reference.

TECHNICAL FIELD

The present invention relates to the technical field of biological information and computational medicine, and more specifically to a method and system for individualized prediction of mental illness on basis of brain function map monkey-human cross-species migration.

BACKGROUND

With environmental changes, the acceleration of the pace of life, the aging of the population and the increasing competition in society, brain development disorders (such as autism and mental retardation), mental diseases (such as depression, obsessive-compulsive disorder, anxiety, etc.) and neurodegenerative diseases (such as Alzheimer's disease and Parkinson's disease) are increasingly affecting the health of people of all ages in our country. The clinical diagnosis of this type of mental illness currently mainly relies on the behavioral scale to evaluate the patient's behavior, but the clinical symptoms of mental illness are complex, and there is a large degree of characterization overlap crossover between the cognitive or behavioral manifestations of different mental illnesses. The diagnosis that only depends on symptoms or behavior performance is obviously inadequate; on the other hand, the diagnosis method based on the behavior scale has a certain degree of subjectivity. Therefore, the clinical diagnosis of mental illness lacks objective and reliable diagnostic criteria.

Non-human primate model animals are species that are closer to humans in terms of brain function and structure. The advantages of using non-human primate models to study human brain diseases are: firstly, the disease models developed by non-human primates are highly similar to human diseases; secondly, the non-human primate model has a relatively simple pathogenic mechanism, which greatly simplifies the disease model, and eliminates and controls factors unrelated to the disease as much as possible; finally, it is possible to obtain brain function connection map data (including brain function imaging data such as magnetic resonance imaging) which is comparable to humans and migrated to each other, The simplified macaque disease model helps to understand the mechanism of human brain diseases, promotes the transformation of basic research into clinical applications, and provides valuable clues for it.

In recent years, with the development of artificial intelligence, artificial intelligence has been successfully applied to fields such as natural language understanding and medical image recognition auxiliary diagnosis systems. "Artificial intelligence+medical imaging" is an auxiliary tool for computers to complete image classification, target detection, image segmentation and search through deep learning based on medical images, and to assist doctors in completing diagnosis and treatment. Airdoc is based on artificial intelligence deep learning, through computer vision image recognition technology, under the guidance of medical experts to form a medical image recognition algorithm model service, and to help doctors improve efficiency. Arterys Cardio DL, a product of Arterys in the United States, is approved by the FDA to use AI-assisted cardiac imaging in the cloud. It uses deep learning to automate tasks that radiologists used to perform manually. It performs automated ventricular segmentation based on conventional cardiac MRI images. The accuracy is comparable to that of experienced doctors. This is also the first application approved by the FDA to use cloud computing and deep learning in the clinic.

The clinical symptoms of mental illness are complicated, and the pathological characteristics between patients are complicated and the heterogeneity is high. At the same time, there is a lack of objective and effective diagnostic criteria for clinical diagnosis.

Therefore, there is an urgent need in the art to develop methods and systems that can more effectively, earlier and more accurately predict individualized mental illness.

SUMMARY OF THE INVENTION

The purpose of the present invention is to provide a more effective, earlier and more accurate method and system for individualized prediction of mental illness.

In a first aspect of the present invention, a method for determining a prediction model of mental illness is provided, comprising:
(a) data acquisition: obtaining functional magnetic resonance data of a non-human primate and human;
(b) pre-processing: based on the functional magnetic resonance data, calculating the Pearson correlation coefficients between the encephalic region of a non-human primate and that of a human, respectively, thereby constructing whole-brain functional connectivity maps of a non-human primate and human, respectively;
(c) encephalic region selection: based on processing result of pre-processed non-human primate, using a feature selection algorithm based on a relevant grouping variable to obtain a characteristic encephalic region related to pathology;
(d) feature construction: based on the characteristic encephalic region obtained by the encephalic region selection and the human functional connectivity map obtained by pre-processing, selecting the functional connectivity connected with the characteristic encephalic region to construct a human functional connectivity feature set;
(e) feature screening: based on the functional connectivity feature set obtained by the feature construction, using a related-based feature selection algorithm to remove a redundant feature and obtaining an optimal functional connectivity feature subset; and
(f) modeling prediction: based on the optimal functional connectivity feature subset obtained by the feature screening, regression analysis is performed to obtain a prediction model of mental illness.

In another preferred embodiment, the prediction model of mental illness is used to predict whether a subject suffers from mental illness.

In another preferred embodiment, the prediction model of mental illness is used for auxiliary diagnosis and/or early diagnosis of whether a subject suffers from mental illness.

In another preferred embodiment, the subject is a human.

In another preferred embodiment, the functional magnetic resonance data includes resting-state functional magnetic resonance data.

In another preferred embodiment, the functional magnetic resonance data is a functional magnetic resonance data of the brain.

In another preferred embodiment, the non-human primates are selected from the group consisting of: monkey, chimpanzee, and a combination thereof.

In another preferred embodiment, the non-human primates include normal wild-type non-human primate models and non-human primate models with mental illness.

In another preferred embodiment, the humans include normal people and people with mental illness.

In another preferred embodiment, in step (b), extracting the average time series of each encephalic region, calculating the Pearson correlation coefficient (i.e. r value) between time series of any two encephalic regions, and using the Fisher-Z transformation to transform the r value into the z value:

$$z = \frac{1}{2}\ln\left(\frac{1+r}{1-r}\right).$$

In another preferred embodiment, in step (c), the feature selection algorithm of the relevant grouping variable comprises: group lasso.

In another preferred embodiment, in step (e), the relevant feature selection algorithm comprises: least absolute shrinkage and selection operator (lasso).

In another preferred embodiment, in step (c), using the group lasso to screen the relevant encephalic region from the whole brain functional connectivity map of the non-human primate, thereby obtaining the characteristic encephalic region of the non-human primate associated with the mental illness.

In another preferred embodiment, the group lasso uses the following formula for analysis, wherein $$\min_{x \in R^N} F(x) = \frac{1}{2}\left\| y - \sum_{g=1}^{G} [A]_g [x]_g \right\|_2^2 + \lambda \sum_{g=1}^{G} w_g \|[x]_g\|_2$$

A represents the whole-brain functional connectivity matrix, and the edges connected to the same encephalic region node g in the feature matrix A are divided into a group (encephalic region), represented by $[A]_g$;

$\lambda$ indicates that in order to prevent the model from overfitting the regularization parameters of the training data, the value is 100 equal points in the range of 0.05 to 1;

$w_g$ indicates the weight of group g (the rooting of the number of elements in group g);

y indicates the non-human primate mental illness group (1) or the normal wild-type group (0);

$[x]_g$ represents the coefficient of the corresponding group;

$$\min_{x \in R^N} F(x)$$

indicates that the N-dimensional real number x is solved so that the value of the function F(x) is the smallest;

$R^N$ represents a N-dimensional real number;

G indicates the total number of groups.

In another preferred embodiment, the non-human primate mental illness group is a transgenic animal model group overexpressing MeCP2.

In another preferred embodiment, in step (e), removing redundant feature(s) from the functional connectivity feature set through least absolute shrinkage and selection operator (lasso) method, thereby obtaining an optimal functional connectivity feature subset.

In another preferred embodiment, the least absolute shrinkage and selection operator (lasso) method is performed using the following formula:

$$\min_{x} \frac{1}{2}\|Mx - y\|_2^2 + \lambda\|x\|_1 : x \in R^P$$

wherein M represents the functional connectivity feature set of the human sample;

x indicates the coefficient of the solution;

$R^P$ represents the P-dimensional real number;

y indicates patients with mental illness (1) or normal subject (0);

$\lambda$ indicates that in order to prevent the model from overfitting the regularization parameters of the training data, the value is calculated by the default method of the lasso function in MATALB.

In another preferred embodiment, using the lasso function in the Statistics and Machine Learning Toolbox of MATLAB to remove redundant feature(s), and the regularization parameter $\lambda$ is calculated using the default method of the function, connecting the functions obtained by different $\lambda$ to take the union, obtaining an optimal function connectivity feature subset.

In another preferred embodiment, in step (f), using sparse logistic regression method for regression analysis.

In another preferred embodiment, the sparse logistic regression method uses the following logistic regression expression:

$$P(y = 1 \mid \hat{s}; w) = \frac{1}{1 + \exp(-w^T \hat{s})}$$

wherein $\hat{s} = [s^T, 1]^T$ represents the augmented feature vector input logistic regression classifier;

s represents the subset of the optimal functional connectivity feature filtered by lasso;

w represents the coefficient of the solution.

In another preferred embodiment, the prediction includes the prediction of human mental illness.

In another preferred embodiment, the mental illness includes autism and obsessive-compulsive disorder.

In another preferred embodiment, the obsessive-compulsive disorder includes the obsessive-compulsive disorder with similar clinical features as autism.

In another preferred embodiment, the method is a non-diagnostic and non-therapeutic method.

In a second aspect of the present invention, a mental illness prediction system is provided, comprising:
(a) a data acquisition module, which is used to acquire functional magnetic resonance data of a non-human primate and human;
(b) a pre-processing module, which calculates the Pearson correlation coefficients between the encephalic region of a non-human primate and that of a human, respectively, thereby constructing whole-brain functional connectivity maps of a non-human primate and human, respectively based on the functional magnetic resonance data;
(c) an encephalic region selection module, which is based on the processing result of the pre-processed non-human primate, using a feature selection algorithm based on a relevant grouping variable to obtain a characteristic encephalic region related to pathology;
(d) a feature construction module, which is based on the characteristic encephalic region obtained by the encephalic region selection and the human functional connectivity map obtained by pre-processing, selecting the functional connectivity connected with the characteristic encephalic region to construct a human functional connectivity feature set;
(e) a feature screening module, which uses a related-based feature selection algorithm to remove a redundant feature and obtaining an optimal functional connectivity feature subset based on the functional connectivity feature set obtained by the feature construction; and
(f) a modeling prediction module, which performs regression analysis based on the optimal functional connectivity feature subset obtained by the feature screening, thereby obtaining a prediction model of mental illness.

In another preferred embodiment, the system further includes: (g) a prediction module, which is based on a prediction model of a mental illness to perform mental illness prediction, auxiliary diagnosis, and/or early diagnosis of the individual to be predicted.

In another preferred embodiment, the characteristic encephalic region is a characteristic encephalic region related to a mental illness.

In another preferred embodiment, the mental illness is selected from the group consisting of autism, obsessive-compulsive disorder, attention deficit hyperactivity disorder, schizophrenia, depression, bipolar affective disorder, and paranoid mental disorder.

In another preferred embodiment, the mental illness is autism and obsessive-compulsive disorder.

In another preferred embodiment, the obsessive-compulsive disorder includes obsessive-compulsive disorder with similar clinical features as autism.

In another preferred embodiment, the mental illness is autism and obsessive-compulsive disorder, and the characteristic encephalic region is a characteristic encephalic region related to autism.

In another preferred embodiment, the characteristic encephalic region related to autism is selected from the group consisting of: left central temporal cortex (TCc), right superior temporal cortex (TCs), right ventrolateral prefrontal cortex (PFCv1), right primary somatosensory cortex (S1), right primary motor cortex (M1), left anterior cingulate cortex (CCa), right central lateral prefrontal cortex (PFCc1), left superior parietal cortex (PCs), the right dorsolateral prefrontal cortex (PFCd1), and a combination thereof.

In a third aspect of the present invention, an early auxiliary diagnosis system for mental illness is provided, comprising:
(a) a data input module, which is used to input functional magnetic resonance imaging data of a subject's brain and construct a whole brain functional connectivity map;
(b) characteristic encephalic region—mental illness discrimination processing module, which constructs the relevant optimal functional connectivity feature set based on the characteristic encephalic region related to mental illness, and performs analysis and processing according to predetermined judgment criterion, thereby obtaining an auxiliary diagnosis result, wherein the judgment criterion is provided by the prediction model method for determining mental illness according to the first aspect of the present invention or the mental illness prediction system according to the second aspect of the present invention; and
(c) an auxiliary diagnosis result output module, which is used to output the auxiliary diagnosis result.

In another preferred embodiment, the judgment criterion is a prediction model obtained based on the optimal functional connectivity feature subset.

In another preferred embodiment, the subject is human.

In another preferred embodiment, the subject includes infant, adolescent, or adult.

In another preferred embodiment, the characteristic encephalic region—mental disease discrimination processing module includes a processor and a storage, wherein the characteristic encephalic region is stored in the storage.

In another preferred embodiment, the output module includes: a display, a printer, a mobile phone, and a tablet.

In another preferred embodiment, the modules are connected in a wired or wireless manner.

In another preferred embodiment, the mental illness is autism and obsessive-compulsive disorder, and the characteristic encephalic region is a characteristic encephalic region related to autism.

In another preferred embodiment, the obsessive-compulsive disorder includes obsessive-compulsive disorder with similar clinical features as autism.

In another preferred embodiment, the characteristic encephalic region related to autism is selected from the group consisting of: left central temporal cortex (TCc), right superior temporal cortex (TCs), right ventrolateral prefrontal cortex (PFCv1), right primary somatosensory cortex (S1), right primary motor cortex (M1), left anterior cingulate cortex (CCa), right central lateral prefrontal cortex (PFCc1), left superior parietal cortex (PCs), the right dorsolateral prefrontal cortex (PFCd1), and a combination thereof.

In a fourth aspect of the present invention, a method for early auxiliary diagnosis of mental illness is provided, comprising:
(a) providing functional magnetic resonance data from a subject;
(b) performing mental illness prediction processing based on the functional magnetic resonance data of the subject, and the prediction processing includes constructing a whole brain functional connectivity map for the input functional magnetic resonance data, constructing the relevant optimal functional connectivity feature set based on the characteristic encephalic region, and predicting according to the predetermined judgment criteria, thereby obtaining an auxiliary diagnosis result, wherein the judgment criteria is provided by the prediction model method for determining mental illness according to the first aspect of the present invention or the mental illness prediction system according to the second aspect of the present invention.

In another preferred embodiment, the functional magnetic resonance data includes resting-state functional magnetic resonance data.

In another preferred embodiment, the subject is human.

It should be understood that, within the scope of the present invention, the technical features specifically described above and below (such as the Examples) can be combined with each other, thereby constituting a new or preferred technical solution which needs not be described one by one.

DESCRIPTION OF DRAWINGS

FIG. 1 shows an overall concept of the present invention. Using the functional connectivity map of the model of macaque with mental illness to extract the characteristic encephalic region related to pathological circuits; for the functional connectivity map of human samples, extracting the functional connectivity related to the characteristic encephalic region to construct the functional connectivity feature set of human samples; using least absolute shrinkage and selection operator (lasso) to remove redundant features and obtain the optimal functional connectivity feature subset; based on the optimal functional connectivity feature subset screened by the lasso, the prediction model is generated through sparse logistic regression discriminant analysis; using the prediction model to predict mental illnesses for individuals.

DETAILED DESCRIPTION OF INVENTION

After extensive and intensive research, a non-human primate model is used for the first time to conduct monkey-human cross-species mental illness correlation research, and an effective and accurate method and system for individualized prediction of clinical mental illness based on a non-human primate model is developed for the first time. Specifically, the present inventors have extracted the characteristic encephalic region related to pathological circuits by the non-human primate model, and removed redundant features through a series of algorithms to obtain the optimal functional connectivity feature subset, and then predicted the individual through the regression model. The method and system of the present invention have many characteristics such as non-invasiveness, high accuracy, high sensitivity, good specificity, and convenience to be popularized. The present invention has been completed on this basis.

Terms

As used herein, the term "whole-brain functional connectivity map" refers to the whole-brain connectivity matrix formed by the correlation coefficients between the time signals of any two encephalic regions of the brain in the functional magnetic resonance imaging data.

As used herein, the term "feature selection" refers to the process of selecting a subset of relevant features from a given feature set.

As used herein, the term "least absolute shrinkage and selection operator" refers to a regression analysis method that performs feature selection and regularization (mathematics) at the same time. It was originally inferred by Robert Tibshirani, a professor of statistics at Stanford University in 1996, based on Leo Breiman's non-negative arguments.

As used herein, the term "sparse logistic regression model" refers to a logistic regression classification model in machine learning.

As used herein, the term "group lasso" refers to a regression analysis method of feature selection and regularization (mathematics) in which least absolute shrinkage and selection operator is extended to group variables.

As used herein, the term "including" or any other similar term is intended to cover non-exclusive inclusion, so that a process, method, article, or equipment/device including a series of elements includes not only those elements, but also other elements that are not explicitly listed, or also including elements inherent in these processes, methods, articles, or equipment/devices.

As used herein, the term "module" refers to a software object or routine (e.g., as an independent thread) that can be concentrated on a single computing system (e.g., computer program, tablet computer (PAD), one or more processors) to execute, such a program for implementing the present invention may be stored on a computer-readable medium, which contains computer program logic or the section of code, for implementing the system modules and methods. Although the system modules and methods as described herein are preferably implemented by software, implementation by hardware or a combination of software and hardware is also possible and conceivable.

Method for Individualized Prediction of Mental Illness on Basis of Brain Function Map Monkey-Human Cross-Species Migration The present invention provides a method for individualized prediction of mental illness on basis of brain function map monkey-human cross-species migration.

In a preferred embodiment, the method of the present invention comprises the following steps:

Step a: Using the brain functional map of the non-human primate mental illness model to extract the characteristic encephalic region:
- a1: collecting the functional magnetic resonance data of mental illness model macaque and normal wild-type macaque samples by MRI scanner;
- a2: according to the whole brain template with a one-to-one correspondence between monkey and human encephalic regions, calculating the Pearson correlation coefficients between the time signals of every two encephalic regions of each macaque sample to construct the whole brain functional connectivity map of the macaque sample;
- a3: dividing the functional connections connected to the same encephalic region node in the whole brain functional connectivity matrix into a group (encephalic region), and using group lasso to model all samples for feature selection at the encephalic region level, and extract the characteristic encephalic region related to pathological loops;

Step b: Extracting all the functional connectivity structure feature sets connected to the characteristic encephalic region from the brain functional map of the human sample:
- b1: obtaining functional magnetic resonance data of the human sample;
- b2: according to the whole brain template with one-to-one correspondence between monkey and human encephalic regions, calculating the Pearson correlation coefficients between the time signals of every two encephalic regions of each human sample to construct the whole brain functional connectivity map of the human sample;
- b3: based on the characteristic encephalic region extracted in step a, extracting all the functional connectivity connected to the characteristic encephalic region from the whole brain functional connectivity map of the human sample to construct the functional connectivity feature set of the human sample;

Step c: Removing redundant features from the feature set through least absolute shrinkage and selection operator (lasso) to obtain the optimal functional connectivity feature subset;
from step b, the functional connectivity feature set of each human sample can be obtained, and redundant features are removed from the functional connectivity feature set of the human sample through least absolute shrinkage and selection operator (lasso) to obtain the optimal functional connectivity feature subset;

Step d: Constructing a prediction model through sparse logistic regression based on the optimal functional connectivity feature subset:
the optimal functional connectivity feature subset of the human sample can be obtained from step c, and sparse logistic regression is used to model the prediction model. The input of the sparse logistic regression is the obtained optimal functional connectivity feature subset;

Step e: Using the prediction model to predict the mental illness of the individual:
extracting the optimal functional connectivity feature subset of the individual to be predicted obtained from step c, and inputting the prediction model from step d to predict the mental illness of the individual to be predicted.

System for Individualized Prediction of Mental Illness

Based on the method for individualized prediction of mental illness provided by the present invention, the present invention also provides a corresponding system for individualized prediction of mental illness.

Figure 5:
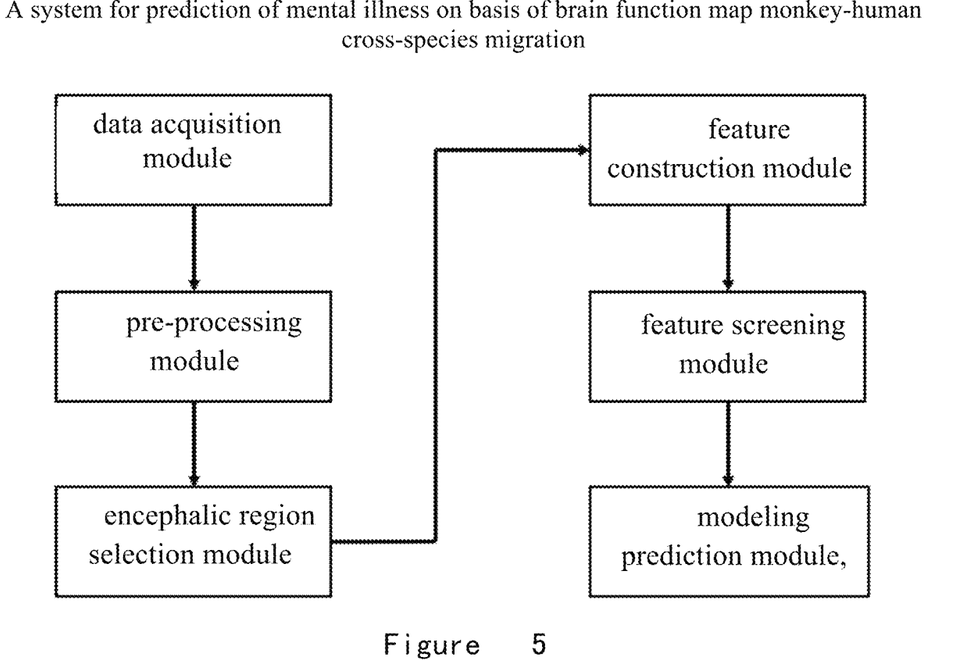
FIG. 5 shows a structural schematic diagram of a system for predicting mental illness based on a brain function map monkey-human cross-species migration of the example.

As shown in FIG. 5, a representative system may include: a data acquisition module, a pre-processing module, an encephalic region selection module, a feature construction module, a feature screening module, and a modeling prediction module. Among them, the data acquisition module is used to acquire functional magnetic resonance data of non-human primates and humans. The preprocessing module is used to calculate the Pearson correlation coefficients between the encephalic regions of non-human primates and those of humans, respectively, so as to construct a whole brain functional connectivity maps of non-human primates and humans. The encephalic region selection module is based on the pre-processed non-human primate processing results and uses a feature selection algorithm based on relevant grouping variables to obtain the characteristic encephalic region related to pathology. The feature construction module constructs a set of human functional connectivity features based on the characteristic encephalic regions obtained by encephalic region selection and human functional (function) connectivity map obtained by pre-processing. The feature screening module uses a related-based feature selection algorithm to remove a redundant feature and obtaining an optimal functional connectivity feature subset based on the functional connectivity feature set obtained by the feature construction. The modeling prediction module performs regression analysis based on the optimal functional connectivity feature subset obtained by the feature screening module, thereby obtaining a prediction model of mental illness, and predicting the mental illness of the individual to be predicted. It should be noted that when the system for individualized prediction of mental illness on basis of brain function map monkey-human cross-species migration provided in the above-mentioned example, only the division of the above-mentioned functional modules is used as an example. In actual applications, according to actual needs and convenience of operation, the above several functional modules can be combined into one module or one module can be decomposed into sub-functional modules to complete the above functions. The names of these modules do not constitute a limitation on the module itself under certain circumstances, it is only for distinguishing various modules or steps, and is not regarded as an improper limitation of the present invention.

Those skilled in the art can understand that the monkey-human cross-species migration of the above-mentioned brain functional map of the individualized prediction system for mental illnesses also includes some other well-known structures, such as processors, memories, etc., so as not to obscure the examples of the present disclosure. The structures are not shown in FIG. 5.

It should be understood that the foregoing system examples can be used to implement the foregoing method examples. The technical principles, the technical problems solved and the technical effects produced are similar. Those skilled in the art can clearly understand that for the convenience and conciseness of the description, the specific working process of the system as described above can refer to the corresponding process in the foregoing method example, which will not be repeated here.

It should be pointed out that the system example and method example of the present invention are respectively described above, instead of limiting the present invention, and the details described for one example can also be applied to another example.

The technical solutions provided by the examples of the present invention have been described in detail above. Although specific examples are used in the present invention to describe the principles and embodiments of the present invention, the description of the examples of the present invention is only applicable to help understand the principles of the examples of the present invention: at the same time, for those skilled in the art, according to the examples of the present invention, changes will be made within the specific embodiments and the scope of application.

It should be noted that the block diagram involved in the present invention is not limited to the form as shown in the present invention, and it can also be divided and/or combined in other ways.

It should also be noted that the marks and words in the drawings are only for explaining the present invention more clearly, and are not regarded as improperly limiting the protection scope of the present invention.

The main advantages of the present invention include:

(a) For the first time, a method for individualized prediction of mental illness on basis of brain function map monkey-human cross-species migration is provided, with high accuracy, high sensitivity, and high specificity.

(b) The present invention performs feature selection based on non-human primate models. The pathogenic mechanism of non-human primate models is relatively simple, which greatly simplifies disease models, avoiding the inconsistency of extracted features caused by human clinical samples based on high phenotypic heterogeneity and genetic heterogeneity in traditional algorithms, and eliminating and controlling factors unrelated to the disease as much as possible to promote more precise discovery of the pathological circuit basis of mental illnesses.

(c) Through artificial intelligence/machine learning, the present invention recognizes the pathological circuit basis of mental illnesses at the brain level based on the functional connectivity map of non-human primate models, and more accurately locates abnormal encephalic region related to the pathological circuit of mental diseases.

(d) The present invention uses cross-species machine learning, deeply digging and analyzing large-scale human brain disease imaging data, looking for brain map features that can be used to predict the diagnosis of human patients, so as to carry out monkey-human transformable imaging research and make individualized predictions of mental illnesses for humans.

(e) When using the artificial intelligence prediction algorithm to predict the individual, the prediction of the individual is entirely based on the model study of the encephalic region signal of the human sample. There is no human judgment involved in this process, which avoids errors caused by subjective factors.

(f) Compared with the prediction model based on the extraction of characteristic encephalic region from human samples, the monkey-human cross-species migration mental illness prediction algorithm based on the brain functional map of the present invention has higher prediction accuracy, sensitivity and specificity, compared with models based on human clinical samples in traditional algorithms.

(g) The present invention uses the brain functional map of non-human primate mental illness models to extract characteristic encephalic region, and establishes a monkey-human transformable imaging method. It is of great significance to the understanding of the neural mechanism of the pathological circuit of human mental illness, providing valuable clues for clinical translational research and early diagnosis of mental illness.

The present invention will be further explained below in conjunction with specific embodiments. It should be understood that these embodiments are only used to illustrate the present invention and not to limit the scope of the present invention. The experimental methods that do not indicate specific conditions in the following examples usually follow the conventional conditions or the conditions recommended by the manufacturer.

Example 1

In this example, taking the autism animal model of transgenic macaque as an example, a monkey-human transformable imaging study was carried out to establish a mental illness prediction method.

The main processes of the specific example, the detailed steps, were as follows:

Step S1: Using MeCP2 overexpression transgenic macaque (a non-human primate autism animal model) to extract characteristic encephalic regions:

S11: Collecting resting state functional magnetic resonance data of MeCP2 overexpression transgenic macaques and normal wild-type macaques samples by MRI Scanner;

S12: According to the whole brain template with one-to-one correspondence between monkey and human encephalic regions, specifically, using the Regional Map template, dividing the monkey cerebral cortex into 80 corresponding encephalic regions, and using the INIA19 template to divide the monkey brain subcutaneous nuclei into 14 encephalic regions, each 47 encephalic regions on the left and right (Table 1), a total of 94 encephalic regions.

TABLE 1

Standard brain partition information involved in the present invention

| Serial Number | Brain Partition (English name and abbreviations) | Brain Partition |
|---|---|---|
| 1 | V1: Visual area 1(primary visual cortex) | primary visual cortex |
| 2 | V2: Visual area 2(secondary visual cortex) | secondary visual cortex |
| 3 | VACv: Anterior visual area, ventral part | Anterior visual area, ventral part |
| 4 | VACd: Anterior visual area, dorsal part | Anterior visual area, dorsal part |
| 5 | S1: Primary somatosensory cortex | Primary somatosensory cortex |
| 6 | S2: Secondary somatosensory cortex | Secondary somatosensory cortex |
| 7 | PCm: Medial parietal cortex | Medial parietal cortex |
| 8 | PCip: Intraparietal cortex | Intraparietal cortex |
| 9 | PCi: Inferior parietal cortex | Inferior parietal cortex |
| 10 | PCs: Superior parietal cortex | Superior parietal cortex |
| 11 | A1: Primary auditory cortex | Primary auditory cortex |

TABLE 1-continued

Standard brain partition information involved in the present invention

| Serial Number | Brain Partition (English name and abbreviations) | Brain Partition |
|---|---|---|
| 12 | A2: Secondary auditory cortex | Secondary auditory cortex |
| 13 | TCpol: Temporal polar cortex | Temporal polar cortex |
| 14 | TCi: Inferior temporal cortex | Inferior temporal cortex |
| 15 | TCv: Ventral temporal cortex | Ventral temporal cortex |
| 16 | TCc: Central temporal cortex | Central temporal cortex |
| 17 | TCs: Superior temporal cortex | Superior temporal cortex |
| 18 | HC: Hippocampus | Hippocampus |
| 19 | PHC: Parahippocampal cortex | Parahippocampal cortex |
| 20 | M1: Primary motor cortex | Primary motor cortex |
| 21 | PMCvl: Ventrolateral premotor cortex | Ventrolateral premotor cortex |
| 22 | PMCdl: Dorsolateral premotor cortex | Dorsolateral premotor cortex |
| 23 | PMCm: Medial premotor cortex | Medial premotor cortex |
| 24 | FEF: Frontal eye field | Frontal eye field |
| 25 | PFCvl: Ventrolateral prefrontal cortex | Ventrolateral prefrontal cortex |
| 26 | PFCcl: Centrolateral prefrontal cortex | Centrolateral prefrontal cortex |
| 27 | PFCdl: Dorsolateral prefrontal cortex | Dorsolateral prefrontal cortex |
| 28 | PFCdm: Dorsomedial prefrontal cortex | Dorsomedial prefrontal cortex |
| 29 | PFCm: Medial prefrontal cortex | Medial prefrontal cortex |
| 30 | PFCpol: Prefrontal polar cortex | Prefrontal polar cortex |
| 31 | PFCoi: Orbitoinferior prefrontal cortex | Orbitoinferior prefrontal cortex |
| 32 | PFCom: Orbitomedial prefrontal cortex | Orbitomedial prefrontal cortex |
| 33 | PFCol: Orbitolateral prefrontal cortex | Orbitolateral prefrontal cortex |
| 34 | CCs: Subgenual cingulate cortex | Subgenual cingulate cortex |
| 35 | CCp: Posterior cingulate cortex | Posterior cingulate cortex |
| 36 | CCr: Retrosplenial cingulate cortex | Retrosplenial cingulate cortex |
| 37 | CCa: Anterior cingulate cortex | Anterior cingulate cortex |
| 38 | G: Gustatory cortex | Gustatory cortex |
| 39 | Ia: Anterior insula | Anterior insula |
| 40 | Ip: Posterior insula | Posterior insula |
| 41 | Amyg: Amygdala | Amygdala |
| 42 | Cau: Caudate | Caudate |
| 43 | Put: Putamen | Putamen |
| 44 | Tha: Thalamus | Thalamus |
| 45 | HT: Hypothalamus | Hypothalamus |
| 46 | NAcc: Nucleus accumbens | Nucleus accumbens |
| 47 | GP: Globus pallidus | Globus pallidus |

Extracting the average time series of each encephalic region of each macaque sample, calculating the Pearson correlation coefficient (i.e., r value) between any two encephalic region time series, and using the Fisher-Z transformation to transform the r value into the z value:

$$z = \frac{1}{2}\ln\left(\frac{1+r}{1-r}\right)$$

Using each z value as the functional connectivity value to construct a 94×94 functional connectivity matrix of the whole brain of the macaque sample (the z value between each encephalic region and itself (z=0) and the remaining 93 encephalic regions);

S13: Dividing the edges connected to the same encephalic region node in the whole brain 94×94 functional connectivity matrix into a group (encephalic region), and dividing the whole brain function connectivity into 94 groups based on the encephalic region, for example, the functional connectivity of the i group (encephalic region) is $\{z_{i,j}|j=1, 2, 3, \ldots, 94, j\neq i\}$. For the regression equation with group structure, group lasso penalizes the l2-norm of each group in the objective function. The expression of the objective function is:

$$\min_{x\in R^N} F(x) = \frac{1}{2}\left\|y - \sum_{g=1}^{G}[A]_g[x]_g\right\|_2^2 + \lambda\sum_{g=1}^{G}w_g\|[x]_g\|_2$$

wherein

A represents the whole brain function connectivity matrix, the edge connected to the same encephalic region node g in the feature matrix A is divided into a group (encephalic region), represented by $[A]_g$, the whole brain function connectivity matrix is divided into 94 groups, λ indicates that in order to prevent the model from overfitting the regularization parameters of the training data (the value is 100 equal points in the range of 0.05 to 1), $w_g$ indicates the weight of group g (the rooting of the number of elements in group g), y indicates MeCP2 overexpression transgenic group (1) or wild-type group (0), $[x]_g$ represents the coefficient of the corresponding group;

$$\min_{x\in R^N} F(x)$$

indicates that finding the minimum value of function F(x) in the real number range;

$R^N$ represents a N-dimensional real number;

G indicates the total number of groups (in the example, G=94).

In the process of optimization, group lasso tries to select as few groups as possible (sparse among groups), and the ℓ 2 norm is within the group, and the sparse constraint is weaker. The effect achieved in this way is that the coefficients of a whole group can be eliminated to zero at the same time. That is, to erase a whole set of features, to achieve the purpose of extracting the characteristic encephalic regions related to the pathology of autism. By taking the union of the characteristic encephalic regions obtained by different regularization parameter λ, the final characteristic encephalic regions related to the pathology of autism are extracted.

Figure 1:
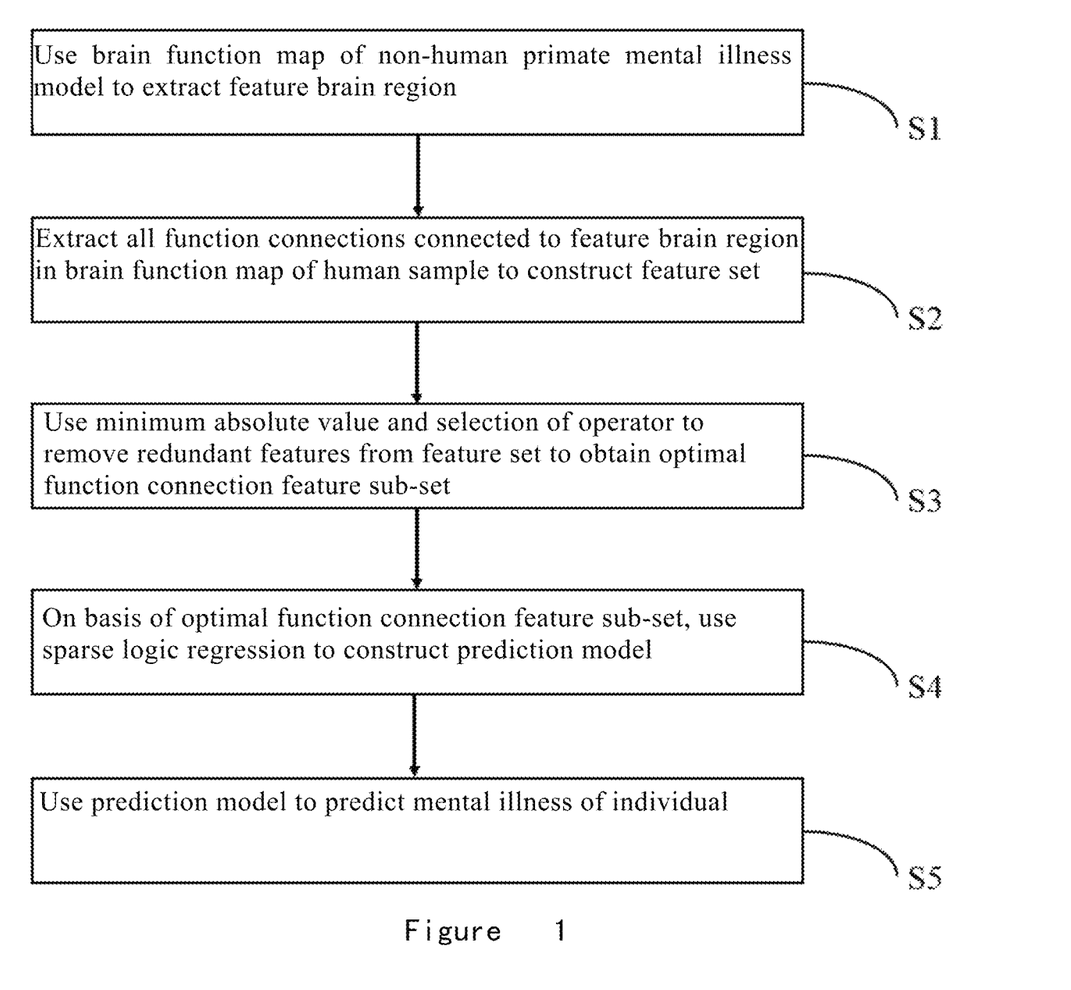
Figure 2:
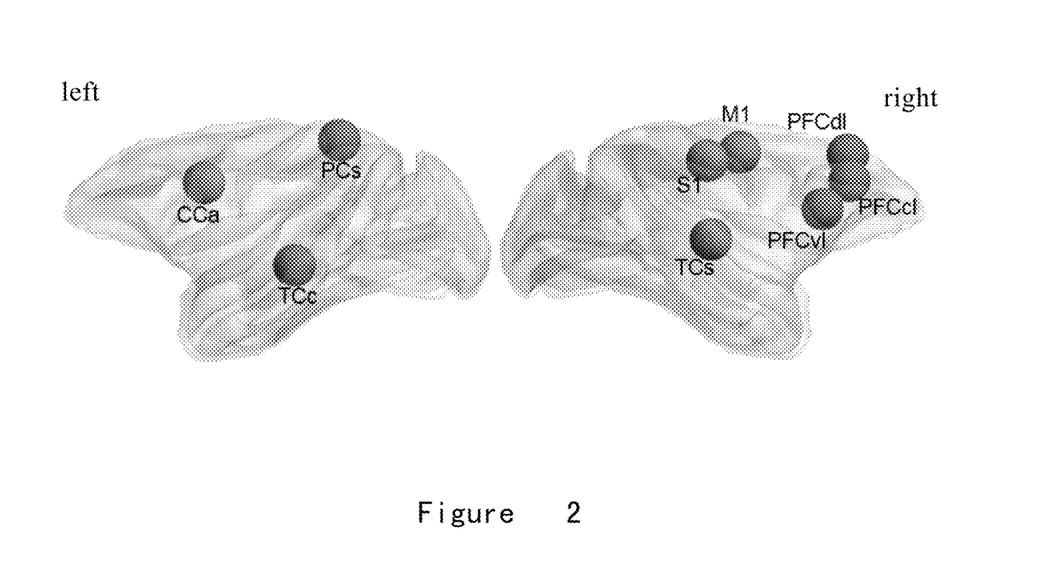
FIG. 2 shows the characteristic encephalic region related to the pathology of autism extracted by the group lasso in the specific example, specifically including: left central temporal cortex (TCc), right superior temporal cortex (TCs), right ventrolateral prefrontal cortex (PFCv1), right primary somatosensory cortex (S1), right primary motor cortex (M1), left anterior cingulate cortex (CCa), right central lateral prefrontal cortex (PFCc1), left superior parietal cortex (PCs), the right dorsolateral prefrontal cortex (PFCd1). The brain partition information involved in FIG. 2 is shown in Table 1.

FIG. 2 shows the characteristic encephalic regions related to the pathology of autism extracted by the group lasso method of this example, including: left central temporal cortex (TCc), right superior temporal cortex (TCs), right ventrolateral prefrontal cortex (PFCv1), right primary somatosensory cortex (S1), right primary motor cortex (M1), left anterior cingulate cortex (CCa), right central lateral prefrontal cortex (PFCc1), left superior parietal cortex (PCs), the right dorsolateral prefrontal cortex (PFCd1). The brain partition information involved in FIG. 2 is shown in Table 1.

Step S2: Extracting all the functional connectivity structure feature sets related to the characteristic encephalic region from the human sample:

S21: Obtaining resting state functional magnetic resonance data of a human sample;

In this specific example, adopting (ABIDE I) Autism Brain Imaging Data Exchange I to disclose the ASD data in the public database. The data collection is marked as: the subject uses the ASD sample mark as the standard for dividing experimental data. This example includes 133 ASD patients (autism spectrum disorders (ASD)) and 203 normal subjects;

S22: According to the whole brain template with a one-to-one correspondence between monkey and human encephalic regions, specifically, using the Regional Map template to divide the human cerebral cortex into 80 corresponding encephalic regions, and using the Freesurfer template to divide the human brain subcutaneous nucleus into 14 encephalic regions, 47 brain regions on the left and right, respectively (Table 1), a total of 94 encephalic regions.

Extracting the average time series of each encephalic region of each human sample, calculating the Pearson correlation coefficient (i.e., r value) between each two encephalic region time series, and using the Fisher-Z transformation to transform the r value into the z value:

$$z = \frac{1}{2} \ln\left(\frac{1+r}{1-r}\right)$$

Using each z value as the functional connectivity value to construct a 94×94 functional connectivity matrix of the whole brain of a human sample (the z value between each encephalic region and itself (z=0) and the remaining 93 encephalic regions);

S23: Based on the characteristic encephalic regions extracted in step S1, extracting all functional connectivity related to the characteristic encephalic regions from the whole brain functional connectivity matrix of the human sample to construct a functional connectivity feature set of the human sample;

Step S3: Using the least absolute shrinkage and selection operator to remove redundant features from the functional connectivity feature set to obtain the optimal functional connectivity feature subset;

From step S2, the functional connectivity feature set of each human sample can be obtained, and redundant features are removed from the feature set through the least absolute shrinkage and selection operator (lasso). The specific expression of the lasso objective function is:

$$\min_x \frac{1}{2}\|Mx - y\|_2^2 + \lambda\|x\|_1 : x \in R^P$$

wherein M represents the set of feature (functional connectivity) of the human sample;

x indicates the coefficient of the solution;

$R^P$ represents the P-dimensional real number;

y indicates patients with autism (1) or normal subjects (0);

$\lambda$ indicates that in order to prevent the model from overfitting the regularization parameters of the training data, using the lasso function in the Statistics and Machine Learning Toolbox of MATLAB to remove redundant features. The regularization parameter $\lambda$ is calculated using the default method of the function. The functional connectivity obtained from different $\lambda$ is taken the union to obtain the optimal feature subset.

Step S4: Constructing a prediction model through sparse logistic regression based on the optimal functional connectivity feature subset:

From step S3, the optimal functional connectivity feature subset of the human sample can be obtained, and the sparse logistic regression (SLR) is used to model the prediction model. The input of the sparse logistic regression is the obtained optimal functional connectivity feature subset. SLR is a method of extending logistic regression analysis into the framework of Bayesian Estimation. It is a method of simultaneously compressing the dimensionality of feature vectors and estimating weights for discrimination. The expression of logistic regression is:

$$P(y = 1 \mid \hat{s}; w) = \frac{1}{1 + \exp(-w^T \hat{s})}$$

wherein $\hat{s} = [s^T, 1]^T$ represents the augmented feature vector input logistic regression classifier;

s represents the subset of the optimal functional connectivity feature screened by lasso;

w represents the coefficient of the solution.

Sparse logistic regression uses a hierarchical Bayesian estimation method to estimate the probability distribution of a parameter vector, wherein the prior distribution of each element of the parameter vector is represented by a Gaussian distribution. Due to the automatic relevance determination (ARD) property of the hierarchical Bayesian estimation method, some Gaussian distributions become sharply peaked at 0, and the weight parameter w in the linear discriminant analysis is set to zero (i.e., Variable selection), by making the weight of the feature quantity that contributes little to the category discrimination close to 0, the feature quantity is excluded from the calculation, only a few feature quantities (sparseness) associated with the discrimination are extracted. For the feature data obtained through SLR, calculating the probability P that the feature data belongs to the category according to each category, and the feature data is assigned to the category that outputs the maximum value.

Step S5: Using the prediction model to predict the mental illness of the individual:

The data corresponding to the optimal functional connectivity feature subset of the individual to be predicted is extracted, and the prediction model obtained from step S4 is input to predict the mental illness of the individual.

Example 2

Performance Verification Experiment

Obsessive-compulsive disorder is one of the symptoms of autism, and its stereotypes and compulsive behaviors coexist, and there is overlap between the two. In order to verify the cross-disease generalization performance of the method of the present invention (the characteristic encephalic regions associated with autism identified based on the MeCP2 overexpression transgenic macaque model), the method of the present invention is also applied to the prediction of patients with obsessive-compulsive disorder. This specific example includes 79 OCD (Obsessive compulsive disorder (OCD)) patients and 92 normal subjects. The prediction method of extracting characteristic encephalic regions based on the method of the present invention predicts the obsessive-compulsive disorder of an individual.

In addition, in order to verify the superiority of the method of the present invention, the method of the present invention (Macaque) is compared with the prediction model of the ASD data extraction characteristic encephalic region (ABIDE II) based on the ABIDE II (Autism Brain Imaging Data Exchange II) public database. Wherein the ABIDE II data collection is marked as: subjects use the ASD sample mark as the standard for dividing the experimental data.

This specific example also includes 60 ASD patients and 89 normal subjects. ASD data based on ABIDE II uses group lasso to extract characteristic encephalic regions related to the pathology of autism, including the left superior temporal cortex (TCs), left secondary visual cortex (V2), left anterior visual area, dorsal part (VACd), left anterior cingulate cortex (CCa), right primary motor cortex (M1), right anterior cingulate cortex (CCa), right centrolateral prefrontal cortex (PFCc1), right ventrolateral prefrontal cortex (PFCv1), right globus pallidus (GP); from the extracted characteristic encephalic regions, extracting the set of all functional connectivity structure features (functional connectivity) connected to the characteristic encephalic region in ABIDE I's ASD whole-brain functional connectivity map data; using lasso to remove redundant features and obtain the optimal subset of functional connectivity features; generating prediction models through sparse logistic regression discriminant analysis; using prediction models to predict mental illness for individuals. The method of using ABIDE II autism samples to select characteristic encephalic regions is called the ABIDE II method.

Figure 3:
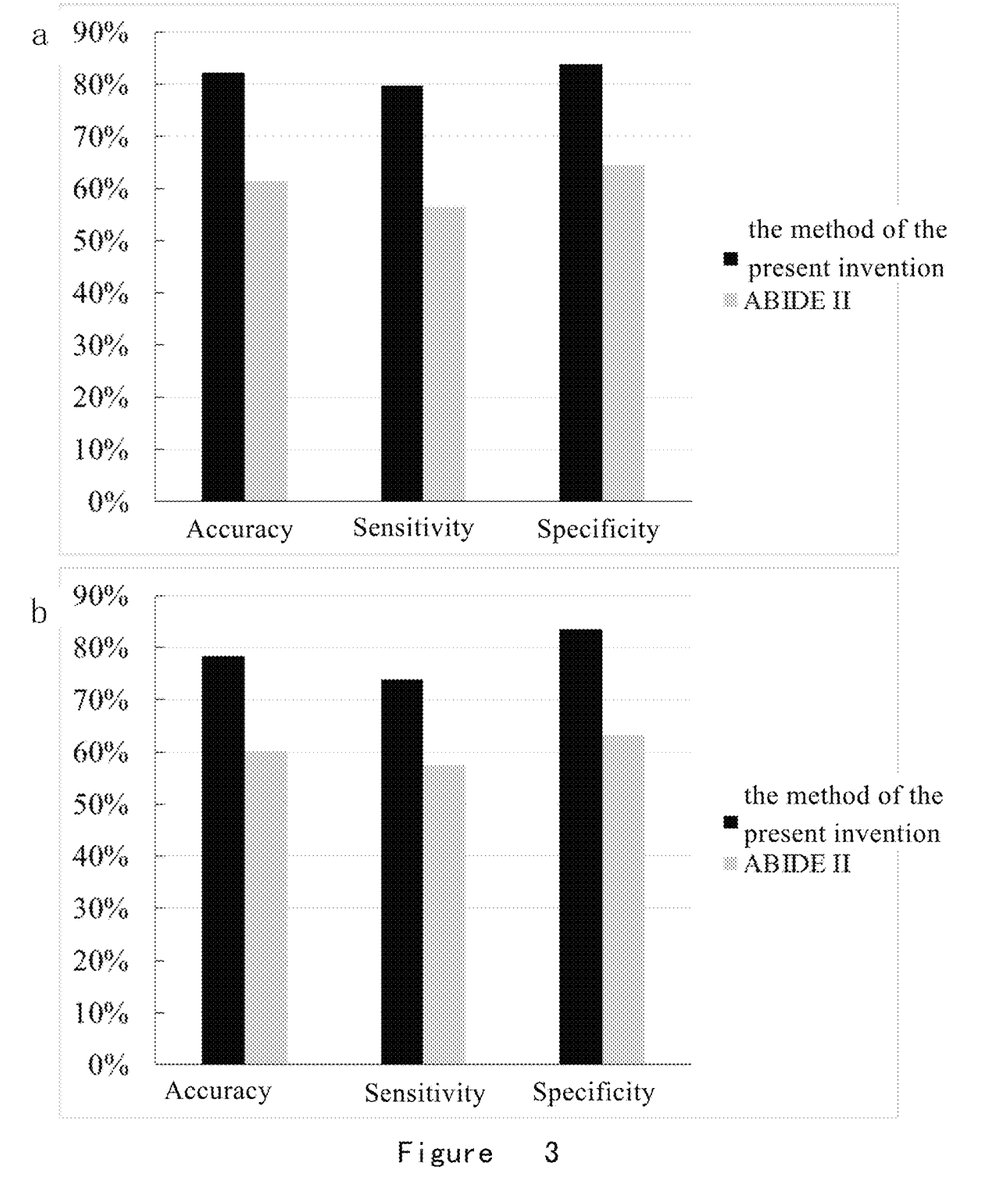
FIG. 3a shows a comparison of the accuracy, sensitivity, and specificity for predicting individual autism between the prediction model based on the MeCP2 overexpression transgenic macaque model and the prediction model based on human autism samples in the specific example.
FIG. 3b shows a comparison of the accuracy, sensitivity and specificity for predicting individual obsessive-compulsive disorder between the prediction model based on the MeCP2 overexpression transgenic macaque model and the prediction model based on human autism samples in the specific example.
Figure 4:
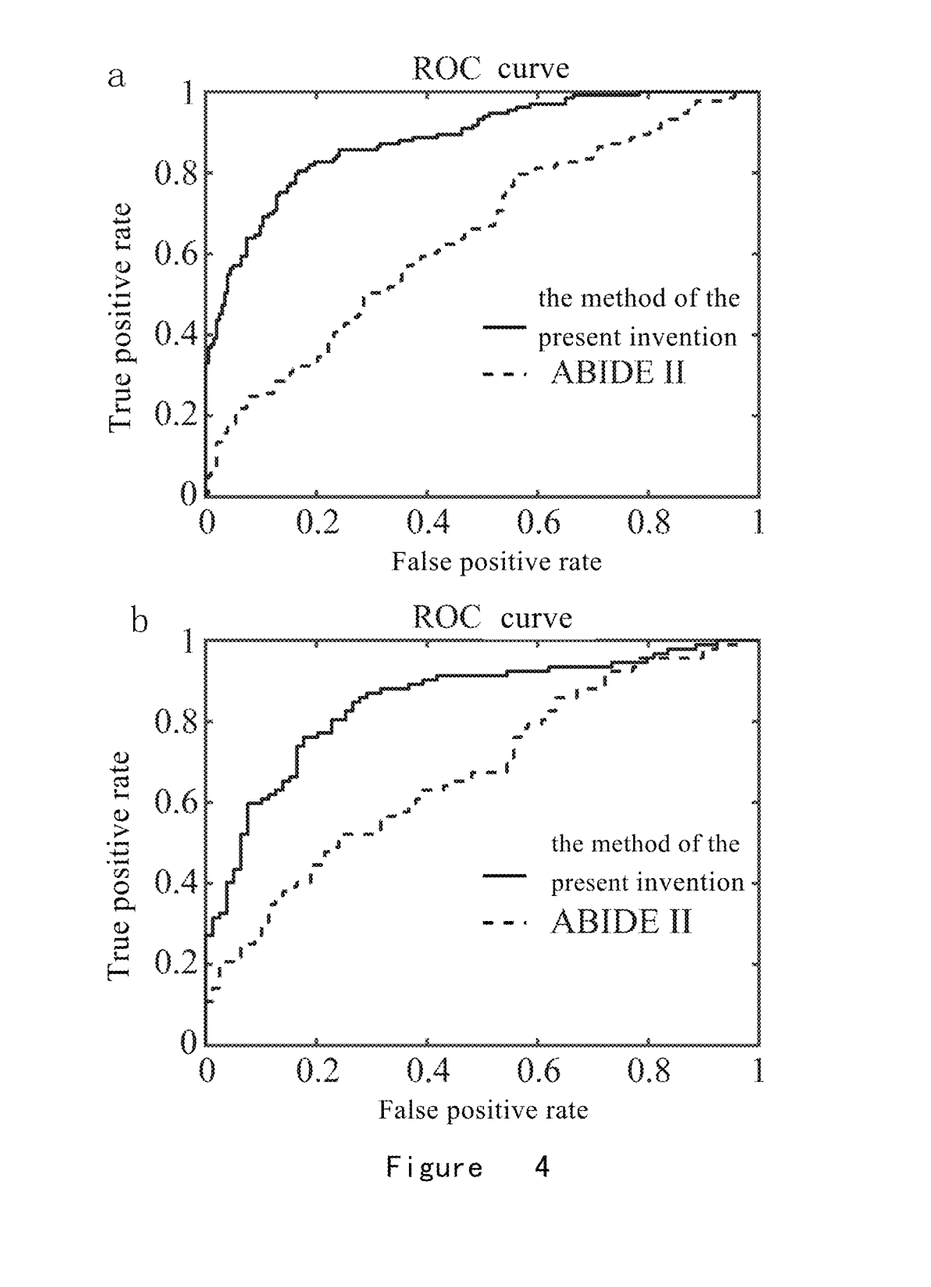
FIG. 4a shows a comparison of the receiver operating characteristic curves (ROC) for the prediction results of individual autism between the prediction model based on the MeCP2 overexpression transgenic macaque model and the prediction model based on human autism samples in the specific example.
FIG. 4b shows a comparison of the receiver operating characteristic curves (ROC) for the prediction results of individual obsessive-compulsive disorder between the prediction model based on the MeCP2 overexpression transgenic macaque model and the prediction model based on human autism samples in the specific example.

The performance comparison between the method of the present invention and the ABIDE II method is shown in FIG. 3, Table 2 and FIG. 4.

FIG. 3a compares the artificial intelligence prediction model based on the MeCP2 overexpression transgenic macaque model with the prediction model based on human ABIDE II autism samples, showing a comparison chart of the accuracy, sensitivity and specificity of individual autism prediction. FIG. 3b compares the artificial intelligence prediction model based on the MeCP2 overexpression transgenic macaque model with the prediction model based on human ABIDE II autism samples, showing a comparison chart of the accuracy, sensitivity and specificity of the prediction of individual obsessive-compulsive disorder. The abscissa represents the accuracy, sensitivity and specificity indicators respectively, the ordinate represents the value of each indicator, and the black histogram represents the accuracy, sensitivity and specificity of the artificial intelligence prediction model based on the MeCP2 overexpression transgenic macaque model, grey histogram shows the accuracy, sensitivity and specificity of the prediction model based on human ABIDE II autism samples.

Compared with the prediction model based on human ABIDE II autism samples, the artificial intelligence prediction model based on the MeCP2 overexpression transgenic macaque model can improve the classification accuracy by 20% for predicting individuals with autism, and the prediction of individuals with obsessive-compulsive disorder can also improve the classification accuracy by 18%.

The accuracy, sensitivity, and specificity values in the histogram shown in FIG. 3 are shown in Table 2, respectively:

TABLE 2

| mental illness | method | accuracy | sensitivity | specificity |
| --- | --- | --- | --- | --- |
| autism | Macaque | 82.14% | 79.70% | 83.74% |
|  | ABIDE II | 63.31% | 56.39% | 64.53% |
| obsessive-compulsive disorder | Macaque | 78.36% | 73.91% | 83.54% |
|  | ABIDE II | 60.23% | 57.61% | 63.29% |

FIG. 4a takes the artificial intelligence prediction model based on the MeCP2 overexpression transgenic macaque model and the prediction model based on the human ABIDE II autism sample as an example, showing a comparison chart of receiver operating characteristic curve (ROC) for predicting the outcome of individual autism. FIG. 4b takes the artificial intelligence prediction model based on the MeCP2 overexpression transgenic macaque model and the prediction model based on human ABIDE II autism samples as an example, showing a comparison chart of receiver operating characteristic curve (ROC) for the prediction result of individual obsessive-compulsive disorder. The abscissa represents the false positive rate (misjudgment rate), and the ordinate represents the true positive rate (sensitivity). The solid line represents the ROC curve of the artificial intelligence prediction model based on the MeCP2 overexpression transgenic macaque model, and the dotted line represents the ROC curve of the prediction model based on the human ABIDE II autism sample. The larger the area under the curve, the higher the classification accuracy.

From the above results, it is not difficult to see that the present invention constructs a monkey-human cross-species autism prediction model based on the MeCP2 overexpression transgenic macaque model, through mathematical model calculation, compared with the prediction model based on the extraction of characteristic encephalic regions from human ABIDE II autism samples, the prediction accuracy, sensitivity and specificity are better based on the MeCP2 overexpression transgenic macaque model. At the same time, the method of the present invention based on the MeCP2 overexpression transgenic macaque model has cross-disease generalization performance, and can be applied not only to the prediction of individual autism, but also to the prediction of diseases with similar clinical characterization to autism, such as obsessive-compulsive disorder and the like. The characteristic encephalic regions extracted based on the MeCP2 overexpression transgenic macaques are mainly distributed in the temporal cortex, prefrontal cortex, sensorimotor cortex and anterior cingulate cortex, while the characteristic encephalic regions acquired based on the human autism sample (ABIDE II) involve the combination of encephalic regions such as the visual cortex, in comparison, the combination of the characteristic encephalic regions we obtained based on the transgenic monkeys is more consistent with the known pathological circuit of autism, and has higher prediction accuracy, indicating that the detected encephalic regions can be used as an important biomarker of autism, and it can be tested and analyzed by applying the biomarker to other independent sample groups. Therefore, through the method of the present invention, the MeCP2 overexpression transgenic macaque model is used to extract encephalic regions related to the pathological circuit of autism, and further through cross-species machine learning, it is used for in-depth mining and analysis of large-scale human autism imaging data, looking for brain map features that can be used to predict the diagnosis of human patients, this will organically establish a monkey-human transformable imaging method, which is of great significance to the understanding of the neural mechanisms of human autism pathological circuits, and provides valuable clues for clinical translational research and early diagnosis of autism.

All literatures mentioned in the present application are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. A method for early auxiliary diagnosis of a mental illness, wherein the mental illness is autism or obsessive-compulsive disorder, and the method comprises:
   (a) obtaining functional magnetic resonance data of a non-human primate and a human, respectively;
   (b) calculating Pearson correlation coefficients based on step (a) the functional magnetic resonance data and between the encephalic region of the non-human primate and that of the human, respectively, thereby constructing whole-brain functional connectivity maps of the non-human primate and the human, respectively;
   (c) based on the whole-brain functional connectivity maps obtained from step (b), using a feature selection algorithm based on a relevant grouping variable to obtain a characteristic encephalic region related to a pathology;
   (d) based on the characteristic encephalic region obtained by step (c) and the human whole-brain functional connectivity map obtained by step (b), selecting a functional connectivity connected with the characteristic encephalic region to construct a human functional connectivity feature set;
   (e) based on the human functional connectivity feature set obtained by step (d), using a relation-based feature selection algorithm to remove a redundant feature and obtaining an optimal functional connectivity feature subset; and
   (f) based on the optimal functional connectivity feature subset obtained by step (e), performing a regression analysis, and therefore obtaining the prediction model of mental illness;
   wherein the functional magnetic resonance data comprises resting-state functional magnetic resonance data;
   (g) providing functional magnetic resonance data from a subject;
   (h) performing mental illness prediction processing based on the functional magnetic resonance data of the subject,
   wherein the mental illness prediction processing comprises:
      constructing a whole brain functional connectivity map from the provided functional magnetic resonance data;
      constructing an optimal functional connectivity feature set based on the characteristic encephalic region; and
      predicting according to a predetermined judgment criteria which is provided by the prediction model obtained in step (f), thereby obtaining an early auxiliary diagnosis result;
   wherein the characteristic encephalic region is selected from the group consisting of: left central temporal cortex (TCc), right superior temporal cortex (TCs), right ventrolateral prefrontal cortex (PFCvl), right primary somatosensory cortex (S1), right primary motor cortex (M1), left anterior cingulate cortex (CCa), right central lateral prefrontal cortex (PFCcl), left superior parietal cortex (PCs), the right dorsolateral prefrontal cortex (PFCdl), and a combination thereof.

2. The method of claim 1, wherein the functional magnetic resonance data is functional magnetic resonance data of the brain.

3. The method of claim 1, wherein in step (b) calculating Pearson correlation coefficients comprises extracting the average time series of each encephalic region, calculating the Pearson correlation coefficient r value between time series of any two encephalic regions, and using the Fisher-Z transformation to transform the r value into z value:

$$z = \frac{1}{2}\ln\left(\frac{1+r}{1-r}\right).$$

4. The method of claim 1, wherein in step (c), the feature selection algorithm of the relevant grouping variable comprises group lasso.

5. The method of claim 1, wherein in step (e), the relation-based feature selection algorithm comprises least absolute shrinkage and selection operator.

6. The method of claim 4, wherein the group lasso uses the following formula for analysis, $$\min_{x \in R^N} F(x) = \frac{1}{2}\left\| y - \sum_{g=1}^{G} [A]_g [x]_g \right\|_2^2 + \lambda \sum_{g=1}^{G} w_g \|[x]_g\|_2$$

wherein
   A represents the whole-brain functional connectivity matrix;
   g represents a node connected to the same encephalic region;
   $[A]_g$ represents A is divided into encephalic region group g;
   λ is a value of 100 equal points in the range of 0.05 to 1, in order to prevent the model from overfitting the regularization parameters of the training data;
   $w_g$ indicates the weight of group g;
   y is either 1 or 0, wherein 1 indicates the non-human primate mental illness group and wherein 0 indicates the normal wild-type group;
   $[x]_g$ represents the coefficient of a group;

$$\min_{x \in R^N} F(x)$$

Indicates the minimum value of function F(x) calculated by the N-dimensional real number x;
   $R_N$ represents a N-dimensional real number; and
   G is the total number of groups.

7. An early auxiliary diagnosis system for mental illness, wherein the mental illness is autism or obsessive-compulsive disorder, and the system comprises:
   (i) a data input module, which inputs a functional magnetic resonance imaging data of a subject's brain and constructs a whole brain functional connectivity map;
   (ii) characteristic encephalic region-mental illness discrimination processing module, which constructs an optimal functional connectivity feature set based on the characteristic encephalic region related to mental illness, and performs analysis and processing according to a predetermined judgment criterion, thereby obtaining an auxiliary diagnosis result, wherein the predetermined judgment criterion is provided by the prediction model obtained from a method comprising the following steps:
(a) obtaining functional magnetic resonance data of a non-human primate and a human, respectively;
(b) calculating Pearson correlation coefficients based on step (a) the functional magnetic resonance data and between the encephalic region of the non-human primate and that of the human, respectively, thereby constructing whole-brain functional connectivity maps of the non-human primate and the human, respectively;
(c) based on the whole-brain functional connectivity maps obtained from step (b), using a feature selection algorithm based on a relevant grouping variable to obtain a characteristic encephalic region related to a pathology;
(d) based on the characteristic encephalic region obtained by step (c) and the human whole-brain functional connectivity map obtained by step (b), selecting a functional connectivity connected with the characteristic encephalic region to construct a human functional connectivity feature set;
(e) based on the human functional connectivity feature set obtained by step (d), using a relation-based feature selection algorithm to remove a redundant feature and obtaining an optimal functional connectivity feature subset; and
(f) based on the optimal functional connectivity feature subset obtained by step (e), performing a regression analysis, and therefore obtaining the prediction model of mental illness; and
(iii) an auxiliary diagnosis result output module, which outputs the auxiliary diagnosis result;
wherein the characteristic encephalic region is selected from the group consisting of: left central temporal cortex (TCc), right superior temporal cortex (TCs), right ventrolateral prefrontal cortex (PFCvl), right primary somatosensory cortex (S1), right primary motor cortex (M1), left anterior cingulate cortex (CCa), right central lateral prefrontal cortex (PFCcl), left superior parietal cortex (PCs), the right dorsolateral prefrontal cortex (PFCdl), and a combination thereof.

8. A method for early auxiliary diagnosis of mental illness, wherein the mental illness is autism and/or obsessive-compulsive disorder, and the method comprises:
(i) providing functional magnetic resonance data from a subject;
(ii) performing mental illness prediction processing based on the functional magnetic resonance data of the subject,
wherein the mental illness prediction processing comprises
constructing a whole brain functional connectivity map from the provided functional magnetic resonance data;
constructing an optimal functional connectivity feature set based on the characteristic encephalic region; and
predicting according to a predetermined judgment criteria, thereby obtaining an auxiliary diagnosis result; and
wherein the characteristic encephalic region is selected from the group consisting of: left central temporal cortex (TCc), right superior temporal cortex TCs), right ventrolateral prefrontal cortex (PFCvl), right primary somatosensory cortex (S1), right primary motor cortex (M1), left anterior cingulate cortex (CCa), right central lateral prefrontal cortex (PFCcl), left superior parietal cortex (PCs), the right dorsolateral prefrontal cortex (PFCdl), and a combination thereof;
wherein the predetermined judgment criteria is provided by the prediction model obtained from a method comprising the following steps:
(a) obtaining functional magnetic resonance data of a non-human primate and a human, respectively;
(b) calculating Pearson correlation coefficients based on step (a) the functional magnetic resonance data and between the encephalic region of the non-human primate and that of the human, respectively, thereby constructing whole-brain functional connectivity maps of the non-human primate and the human, respectively;
(c) based on the whole-brain functional connectivity maps obtained from step (b), using a feature selection algorithm based on a relevant grouping variable to obtain a characteristic encephalic region related to a pathology;
(d) based on the characteristic encephalic region obtained by step (c) and the human whole-brain functional connectivity map obtained by step (b), selecting a functional connectivity connected with the characteristic encephalic region to construct a human functional connectivity feature set;
(e) based on the human functional connectivity feature set obtained by step (d), using a relation-based feature selection algorithm to remove a redundant feature and obtaining an optimal functional connectivity feature subset; and
(f) based on the optimal functional connectivity feature subset obtained by step (e), performing a regression analysis, and therefore obtaining the prediction model of mental illness.

9. The method of claim 1, wherein the non-human primate comprises a monkey, or a chimpanzee.

10. The mental illness prediction system of claim 1, wherein the non-human primate comprises a monkey, or a chimpanzee.

11. The method of claim 8, wherein the subject comprises a non-human primate, or a human.

12. The method of claim 1, wherein the mental illness is austism.

13. The method of claim 1, wherein the mental illness is obsessive-compulsive disorder.

14. The early auxiliary diagnosis system of claim 7, wherein the mental illness is autism.

15. The early auxiliary diagnosis system of claim 7, wherein the mental illness is obsessive-compulsive disorder.

16. The method of claim 1, wherein the characteristic encephalic region related to a pathology is an encephalic region related to autism or obsessive-compulsive disorder.

17. The early auxiliary diagnosis system of claim 7, wherein the encephalic region is an encephalic region related to autism or obsessive-compulsive disorder.

18. The method for early auxiliary diagnosis of claim 8, wherein the mental illness is autism.

* * * * *